(12) United States Patent
Saito et al.

(10) Patent No.: US 12,204,119 B2
(45) Date of Patent: Jan. 21, 2025

(54) OPTICAL FILMS AND METHODS OF MANUFACTURING SUCH OPTICAL FILMS

(71) Applicant: 3M INNOVATIVE PROPERTIES COMPANY, St. Paul, MN (US)

(72) Inventors: Yuji Saito, Sagamihara (JP); Jiro Hattori, Atsugi (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 481 days.

(21) Appl. No.: 17/597,810

(22) PCT Filed: Aug. 3, 2020

(86) PCT No.: PCT/IB2020/057341
§ 371 (c)(1),
(2) Date: Jan. 25, 2022

(87) PCT Pub. No.: WO2021/024169
PCT Pub. Date: Feb. 11, 2021

(65) Prior Publication Data
US 2022/0252766 A1 Aug. 11, 2022

Related U.S. Application Data

(60) Provisional application No. 62/883,221, filed on Aug. 6, 2019.

(51) Int. Cl.
*G02B 5/00* (2006.01)
*B29D 11/00* (2006.01)
(Continued)

(52) U.S. Cl.
CPC ........ *G02B 5/003* (2013.01); *B29D 11/00634* (2013.01); *G02B 5/22* (2013.01); *G02F 1/0063* (2013.01)

(58) Field of Classification Search
CPC .......... G02B 5/003; G02B 5/22; G02B 5/206; G02B 5/208; G02B 5/223; B29D 11/00634; B29D 11/00788; G02F 1/0063
(Continued)

(56) References Cited

U.S. PATENT DOCUMENTS 10,816,713 B2   10/2020   Miyazaki
2010/0165241 A1   7/2010   Kim
(Continued)

FOREIGN PATENT DOCUMENTS

KR   1020080094150   * 10/2008  ............... G02B 5/20
KR   10-2019-0062331   6/2019
(Continued)

OTHER PUBLICATIONS

Kamimori, "Infrared absorption spectra of metal oxides", Bunseki Kagaku, 1967, vol. 16, No. 10, pp. 1050-1055.
(Continued)

*Primary Examiner* — William R Alexander
(74) *Attorney, Agent, or Firm* — Jeffrey M. Olofson

(57) ABSTRACT

An optical film includes a film body defining an upper surface, a lower surface opposite to the upper surface, and at least one outer edge extending between the upper and lower surfaces. The optical film also includes at least one energy radiated discolored portion formed in the film body. The at least one energy radiated discolored portion includes a radiation absorbing material.

19 Claims, 9 Drawing Sheets

(51) Int. Cl.
    *G02B 5/22*      (2006.01)
    *G02F 1/00*      (2006.01)
(58) Field of Classification Search
    USPC .......................................................... 359/885
    See application file for complete search history.

(56)               References Cited

U.S. PATENT DOCUMENTS

2011/0007398  A1*   1/2011   Lim ..................... H01J 11/10
                                                    359/614
2019/0025621  A1    1/2019   Shin

FOREIGN PATENT DOCUMENTS

KR    10-2019-0082268      7/2019
WO    WO 2014-091949       6/2014

OTHER PUBLICATIONS

International Search Report for PCT International Application No. PCT/IB2020/057341, mailed on Nov. 6, 2020, 3 pages.

* cited by examiner

OPTICAL FILMS AND METHODS OF MANUFACTURING SUCH OPTICAL FILMS

CROSS REFERENCE TO RELATED APPLICATIONS

This application is a national stage filing under 35 U.S.C. 371 of PCT/IB2020/057341, filed Aug. 3, 2020, which claims the benefit of U.S. Provisional Patent Application No. 62/883,221, filed Aug. 6, 2019, the disclosures of which are incorporated by reference in their entirety herein.

TECHNICAL FIELD

The present disclosure relates to optical films and methods of manufacturing such optical films.

BACKGROUND

Optical films, such as prism films, are used in various electronic devices. For example, such optical films may be used in displays of smart phones, tablets, and other types of electronic devices. It is desirable to decrease a bezel width of the display of such electronic devices in order to increase a screen size of the display. However, the reduced bezel width causes light leakage at an LED side of a backlight associated with the display. Generally, a top portion of the optical film includes a black adhesive tape called rim tape. Conventional designs use the rim tape to block the light leakage because there is sufficient overlap between the optical film and the rim tape. However, as the overlap in current designs is small, the rim tapes do not reduce the light leakage. In such cases, another black adhesive tape is applied on a diffuser film of the electronic devices.

In order to further reduce the bezel width, the black adhesive tape on the diffuser film is removed and a cross-section of the optical film is painted using conventional printing methods such as ink-jet printer to reduce the light leakage. However, painting on the cross-section of the optical film can be technically challenging. It may therefore be desirable to have an optical film that allows reduction of the light leakage for displays with narrow bezel width.

SUMMARY

Generally, the present invention relates to optical films. The present invention also relates to optical films for use with electronic applications and methods of manufacturing such optical films.

Some embodiments of the present disclosure relate to an optical film including a film body. The film body defines an upper surface, a lower surface opposite to the upper surface, and at least one outer edge extending between the upper and lower surfaces. The optical film further includes at least one energy radiated discolored portion formed in the film body. The at least one energy radiated discolored portion includes a radiation absorbing material.

In some embodiments, the at least one energy radiated discolored portion is black in color.

In some embodiments, the at least one energy radiated discolored portion is configured to transmit less than 80% of incident light.

In some embodiments, the at least one energy radiated discolored portion is formed in at least a section of the at least one outer edge of the film body.

In some embodiments, the film body includes a plurality of outer edges, and wherein the at least one energy radiated discolored portion is formed in each of the plurality of outer edges.

In some embodiments, the film body further includes at least one through aperture defined by an inner surface, wherein the at least one energy radiated discolored portion is formed in the inner surface defining the at least one through aperture.

In some embodiments, the at least one energy radiated discolored portion is formed in the upper portion of the film body.

In some embodiments, the at least one energy radiated discolored portion comprises a plurality of linear energy radiated discolored portions formed in the upper surface of the film body.

In some embodiments, the radiation absorbing material is an exothermic metal oxide.

In some embodiments, the film body is made of one or more resins mixed with the radiation absorbing material.

In some embodiments, the film body includes a coating of the radiation absorbing material.

In some embodiments, a section of the film body is irradiated by a laser beam for forming the at least one energy radiated discolored portion in the film body.

In some embodiments, the laser beam includes at least one of a carbon dioxide laser and an yttrium aluminum garnet laser.

In some embodiments, the film body includes a substrate and a plurality of micro-structures disposed on the substrate.

Some embodiments of the present disclosure relate to a method of manufacturing an optical film. The method includes forming a film body defining an upper surface, a lower surface opposite to the upper surface, and at least one outer edge extending between the upper and lower surfaces. At least one section of the film body includes a radiation absorbing material. The method further includes forming at least one discolored portion in the film body. The at least one discolored portion is formed by irradiating a laser beam along the at least one section of the film body that includes the radiation absorbing material.

In some embodiments, the at least one discolored portion is formed in the at least one section of the at least one outer edge of the film body.

In some embodiments, the film body comprises a plurality of outer edges, and wherein the at least one discolored portion is formed in each of the plurality of outer edges.

In some embodiments, the film body further comprises at least one through aperture defined by an inner surface, wherein the at least one discolored portion is formed in the inner surface defining the at least one through aperture.

In some embodiments, the at least one discolored portion is formed in the upper portion of the film body.

In some embodiments, the radiation absorbing material is an exothermic metal oxide.

Some embodiments of the present disclosure relate to a method of manufacturing an optical film. The method includes forming a mixture of one or more resins and a radiation absorbing material. The method further includes forming a film body from the mixture; and irradiating at least one section of the film body by a laser beam to form at least one discolored portion.

BRIEF DESCRIPTION OF THE DRAWINGS

Exemplary embodiments disclosed herein may be more completely understood in consideration of the following detailed description in connection with the following figures. The figures are not necessarily drawn to scale. Like numerals used in the figures refer to like components. When pluralities of similar elements are present, a single reference numeral may be assigned to each plurality of similar elements with a small letter designation referring to specific elements. When referring to the elements collectively or to a non-specific one or more of the elements, the small letter designation may be eliminated. However, it will be understood that the use of a numeral to refer to a component in a given figure is not intended to limit the component in another figure labeled with the same number.

DETAILED DESCRIPTION

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to an optical film, such as a prism film, reflective polarizer film, diffuser film, protection film, or color conversion film, that may be used in various electronic applications that include displays having a narrow bezel width, such as in displays of smart phones, tablets, and so forth. The optical film may reduce leakage of light through edges of the optical film. The present disclosure also relates to methods of manufacturing the optical film.

Figure 1:
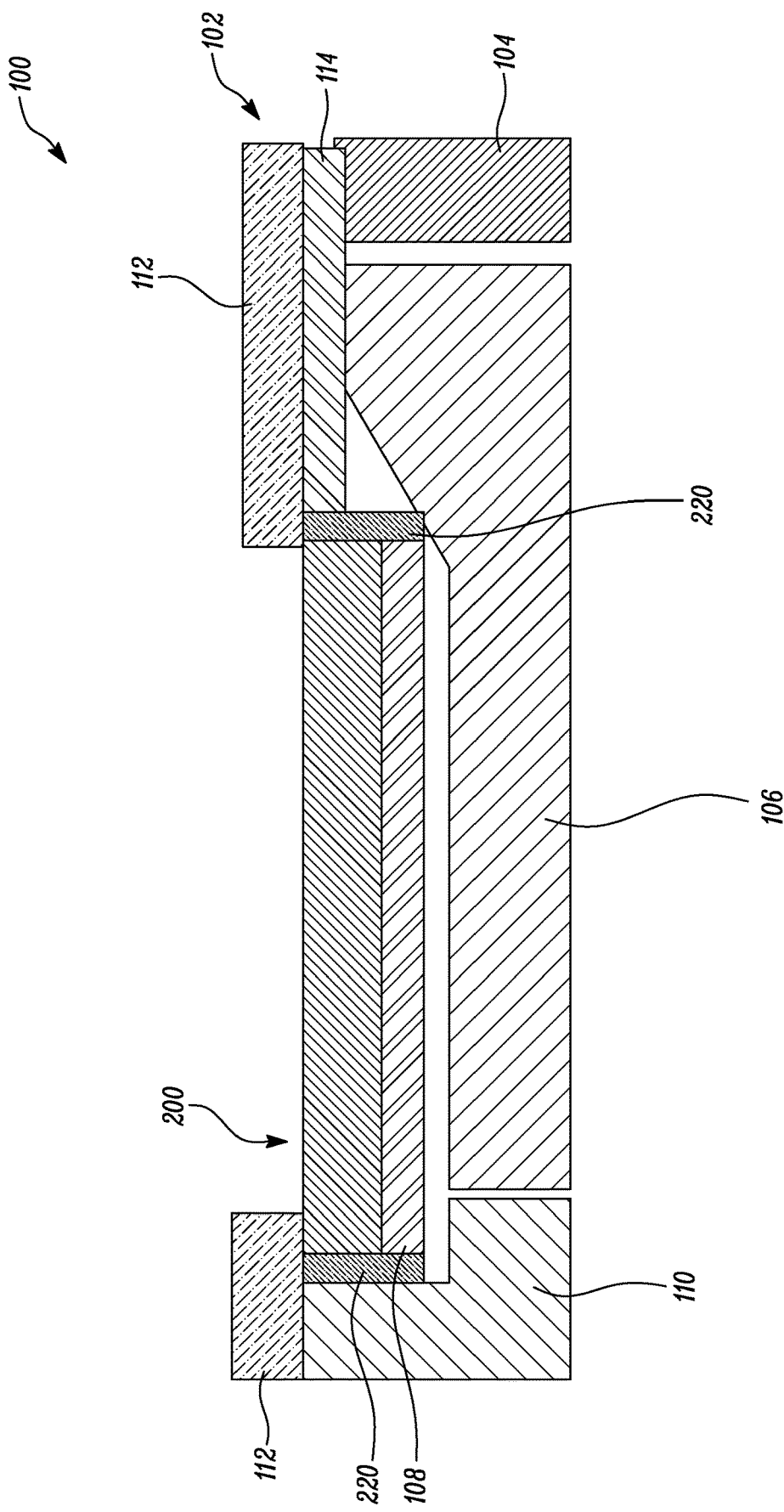
FIG. 1 is a cross-sectional view of an electronic device having an optical film according to an embodiment of the present disclosure.

FIG. 1 illustrates an exemplary electronic device 100. For example, the electronic device 100 may be embodied as a smart phone, a tablet, or any other electronic device that includes one or more optical films. The electronic device 100 includes a display 102. The display 102 is a backlight display having a Light Emitting Diode (LED) 104. A light guide plate 106 is disposed proximate to the LED 104 for directing light beams emitting from the LED 104 in a desired direction. The electronic device 100 also includes a diffuser film 108 and an optical film 200. The diffuser film 108 is disposed below the optical film 200. Further, the electronic device 100 includes a chassis 110 that supports a number of components of the electronic device 100. For example, the chassis 110 may support the optical film 200, the diffuser film 108, and/or the light guide plate 106. Further, the electronic device 100 includes rim tapes 112. The rim tapes 112 are embodied as adhesive tapes that are used to fix the optical film 200. In some embodiments, the rim tapes 112 may be optional. The electronics device 100 also includes a Flexible Printed Circuit (FPC) 114 in addition to other components (not shown). It should be noted that a construction of the electronic device 100 described herein is exemplary in nature and the electronic device 100 may include any other combination of components as per application requirements.

Figure 2:
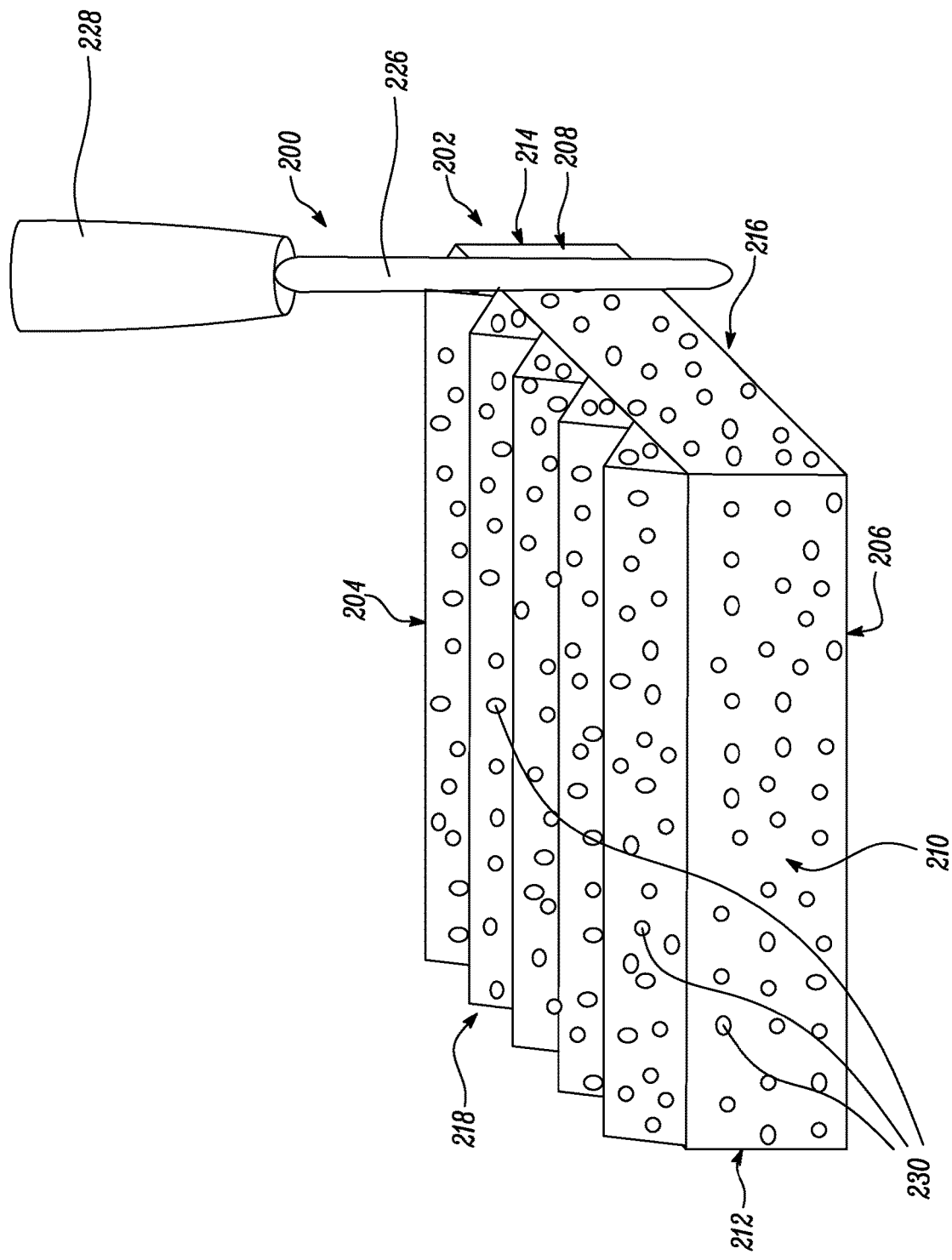
FIG. 2 is a perspective view of a film body of the optical film shown in FIG. 1.

Referring now to FIG. 2, a perspective view of the optical film 200 is illustrated. The optical film 200 is embodied as a prism film herein. The optical film 200 may embody a Brightness Enhancement Film (BEF). Alternatively, the optical film 200 may include a Light Control Film (LCF), a stacked prism film, combination of a stacked prism film and a diffuser film, and the like. The optical film 200 includes a film body 202 defining an upper surface 204, a lower surface 206 opposite to the upper surface 204, and at least one outer edge 208, 210, 212, 214 extending between the upper and lower surfaces 204, 206. The upper surface 204 may be facing a viewer. Further, the film body 202 includes a plurality of outer edges 208, 210, 212, 214. In the illustrated embodiment, the film body 202 defines four outer edges 208, 210, 212, 214. However, the film body 202 may include any number of outer edges based on application requirements.

The film body 202 is made of one or more resins. Further, the film body 202 includes a substrate 216 and a plurality of micro-structures 218 disposed on the substrate 216. More particularly, the substrate 216 is embodied as a lower portion 216 of the film body 202. The substrate 216 is hereinafter interchangeably referred to as the lower portion 216 of the film body 202. Whereas, the micro-structures 218 define an upper portion 218 of the film body 202. The micro-structures 218 are hereinafter interchangeably referred to as the upper portion 218 of the film body 202.

Further, the upper surface 204 of the film body 202 is defined by the micro-structures 218 whereas the lower surface 206 of the film body 202 is defined by the substrate 216. In the illustrated example, the micro-structures 218 include prism structures. Alternatively, the micro-structures 218 may include other two-dimensional structures such as ribs or three-dimensional structures such as posts. Further, the micro-structures 218 may be formed on the substrate 216 by various methods, such as extrusion, cast-and-cure, coating or some other method. The micro-structures 218 and/or the substrate 216 may include pigments that absorb infrared. The micro-structures 218 may be manufactured from resins. In one example, the micro-structures 218 may be manufactured from acrylic resins. In an example, the resins are coated on the substrate 216 and then cured by Ultraviolet (UV) radiation. Further, the substrate 216 may be made from Polyethylene Terephthalate (PET) resins.

Figure 3:
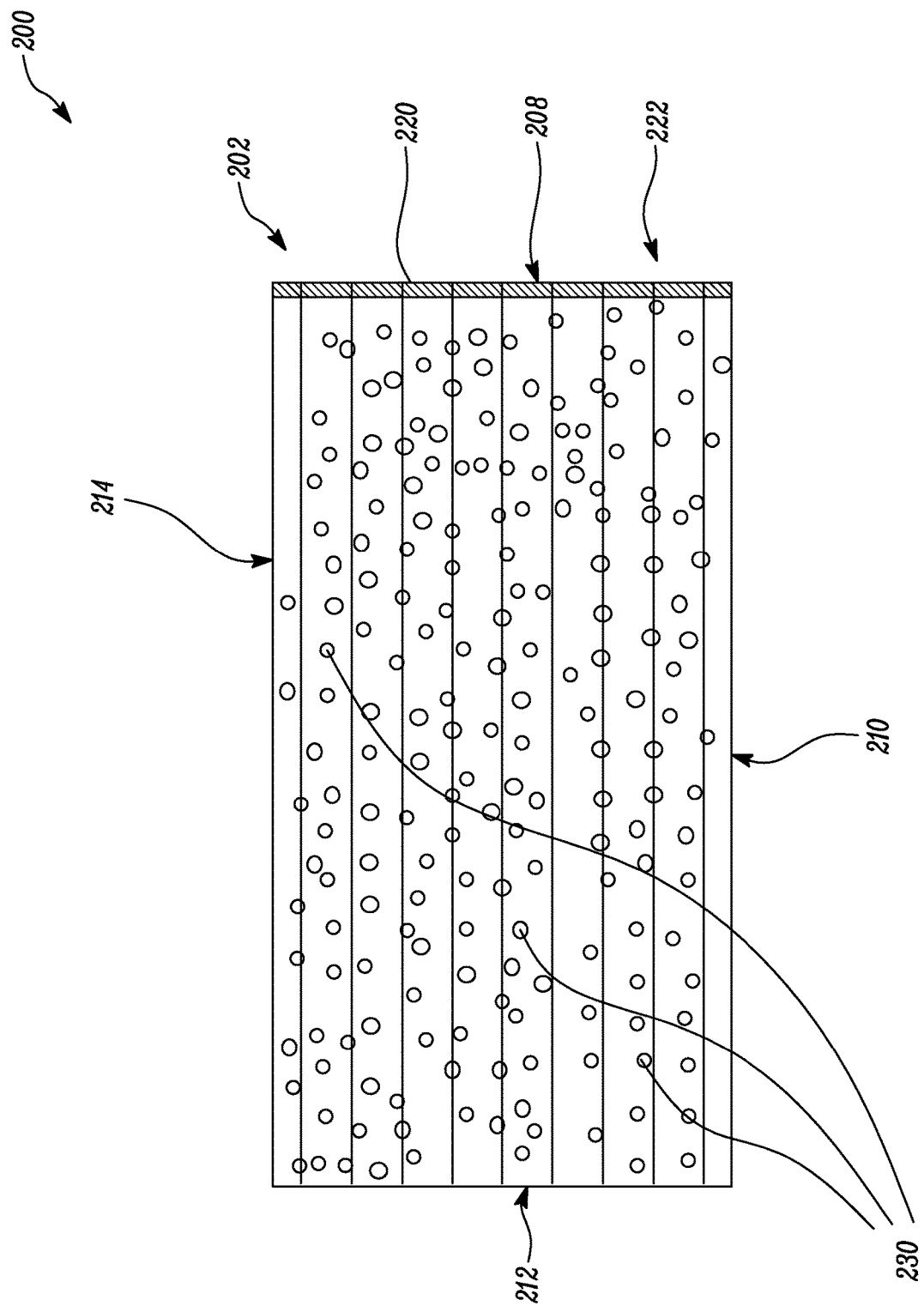
FIG. 3 is a top view of the optical film of FIG. 2 having an energy radiated discolored portion according to an embodiment of the present disclosure.

Referring now to FIG. 3, the optical film 200 includes a radiation absorbing material. The radiation absorbing material is an exothermic metal oxide. The metal oxide may include pigments, such as bismuth oxide, yttrium oxide, zirconium dioxide, molybdenum trioxide, neodymium oxide, ATO (Antimony Tin Oxide), ITO (Indium Tin Oxide), or their mixtures. In an example, the film body 202 is made of one or more resins mixed with the radiation absorbing material. For example, the resins are mixed with the radiation absorbing material and then processed to form the film body 202. In such examples, the radiation absorbing material may be dispersed within the film body 202. The radiation absorbing material may be mixed with the resins of each of the micro-structures 218 and the substrate 216. The radiation absorbing material is illustrated as particles 230 dispersed within the film body 202.

Further, the optical film 200 includes at least one energy radiated discolored portion 220 formed in the film body 202. The energy radiated discolored portion 220 may be hereinafter interchangeably referred to as the discolored portion 220. The energy radiated discolored portion 220 reduces leakage of light from edges 208, 210, 212, 214 of the optical film 200. The at least one energy radiated discolored portion 220 may be gray or black in color. The energy radiated discolored portion 220 is embodied as a carbonized portion formed in the film body 202. The at least one energy radiated discolored portion 220 is configured to transmit less than 80% of incident light.

The at least one energy radiated discolored portion 220 is formed in at least a section 222 of the at least one outer edge 208 of the film body 202. The at least one section 222 of the film body 202 includes the radiation absorbing material. In the illustrated example, the energy radiated discolored portion 220 is formed in the outer edge 208 of the film body 202. Further, when the optical film 200 is circular or elliptical in shape, the discolored portion 220 may be provided in one or more sections of a film body of such optical films.

In some examples, the at least one energy radiated discolored portion 220 is formed in each of the plurality of outer edges 208, 210, 212, 214. In the illustrated example, the discolored portion 220 is provided in each of the upper portion 218 (see FIG. 2) and the lower portion 216 (see FIG. 2) of film body 202. However, in another example, the at least one energy radiated discolored portion 220 is formed in the upper portion 218 of the film body 202. In yet another example, the at least one energy radiated discolored portion 220 is formed in the lower portion 216 of the film body 202.

The at least one energy radiated discolored portion 220 includes the radiation absorbing material. Further, the section 222 of the film body 202 is irradiated by a laser beam 226 (shown in FIG. 2) for forming the at least one energy radiated discolored portion 220 in the film body 202. The laser beam 226 is emitted from a laser equipment 228 (shown in FIG. 2). Further, the discolored portion 220 is formed by irradiating the laser beam 226 along the section 222 of the film body 202 that includes the radiation absorbing material. The radiation absorbing material absorbs electromagnetic radiation and releases heat. The heat carbonizes the resins of the film body 202 to form the discolored portion 220. Thus, the laser beam 226 is irradiated to carbonize the resins of the film body 202 and/or change a color of the pigment of the film body 202 to reduce the light leakage from one or more edges 208, 210, 212, 214 of the optical film 200.

In the illustrated example, the outer edge 208 of the film body 202 is irradiated by the laser beam 226 to form the energy radiated discolored portion 220. Moreover, when the energy radiated discolored portion 220 is formed in each of the plurality of outer edges 208, 210, 212, 214, each of the outer edges 208, 210, 212, 214 of the film body 202 is irradiated by the laser beam 226 to form a plurality of energy radiated discolored portions thereon. A carbon dioxide laser and/or an yttrium aluminum garnet laser may be used as the laser beam 226. It should be noted that the laser beam 226 may be applied when a web of the optical film 200 is converted into components or the laser beam 226 may be applied separately before or after the web of the optical film 200 is converted into components. Further, a color of the radiation energy discolored portion 220 may be varied based on adjusting power of the laser beam 226 or amount of the radiation absorbing material.

The invention is further described with reference to the following examples.

Example 1

In this example, a mixture of prism resins that includes acrylic resins and nano-zirconia are coated on the substrate 216 and cured by UV radiation. The substrate 216 is made of PET resins with a thickness of approximately 77 micrometers (μm). Further, a thickness of the prism resins that are coated on the substrate 216 is approximately equal to 15 μm. The laser beam 226 selected is a carbon dioxide laser beam operating at a power of approximately 12 watts and a wavelength of approximately 10.6 μm. On examining the final product, it is observed that the prism resins are carbonized and exhibit dark color.

Example 2

In this example, acrylic resins and nano-zirconia are selected as the prism resins to be coated on the substrate 216. Further, the radiation absorbing material is mixed with the prism resins. More particularly, a mixture of yttrium oxide and molybdenum trioxide is added to the prism resins. The radiation absorbing material is added to the prism resins with a concentration of 0.25%, 1%, and 10% (Parts per Hundred Resin) and shaken in a vial. The prism resins are coated on the substrate 216 and cured by UV radiation. The substrate 216 is made of PET resins with a thickness of approximately 77 micrometers (μm). Further, a thickness of the prism resins that are coated on the substrate 216 is equal to approximately 15 μm. The laser beam 226 selected is a carbon dioxide laser beam operating at a power of approximately 12 watts and a wavelength of approximately 10.6 μm. On examining the final product, it is observed that the prism resins are carbonized and the color of the radiation absorbing material is changed to black.

Figure 4:
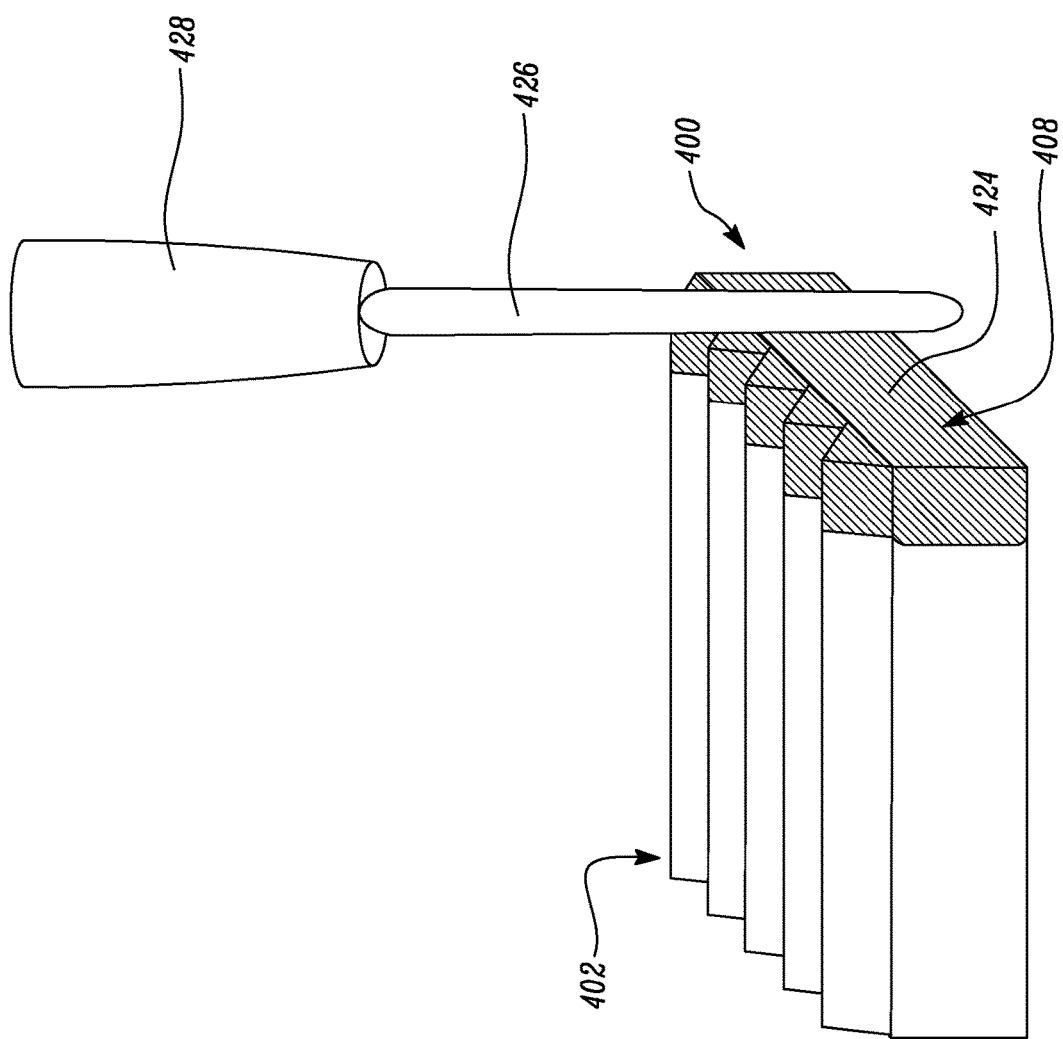
FIG. 4 is a perspective view illustrating another film body having a coating of radiation absorbing material applied thereon.

Referring to FIG. 4, an alternate embodiment of a film body 402 associated with an optical film 400 is illustrated. The film body 402 is similar to the film body 202 described in relation to FIGS. 2 and 3. In this embodiment the film body 402 includes a coating 424 of the radiation absorbing material. The radiation absorbing material is similar to the radiation absorbing material described earlier in this section with reference to the optical film 200. Further, the film body 402 may be coated with the radiation absorbing material up to a certain thickness. The coating 424 may be provided using a sputter coating process. Further, the film body 402 may be irradiated by a laser beam 426 emitted from a laser equipment 428 similar to the laser beam 226 emitted from the laser equipment 228 for forming the at least one energy radiated discolored portion (not shown) on an outer edge 408 of the film body 402.

Figure 5:
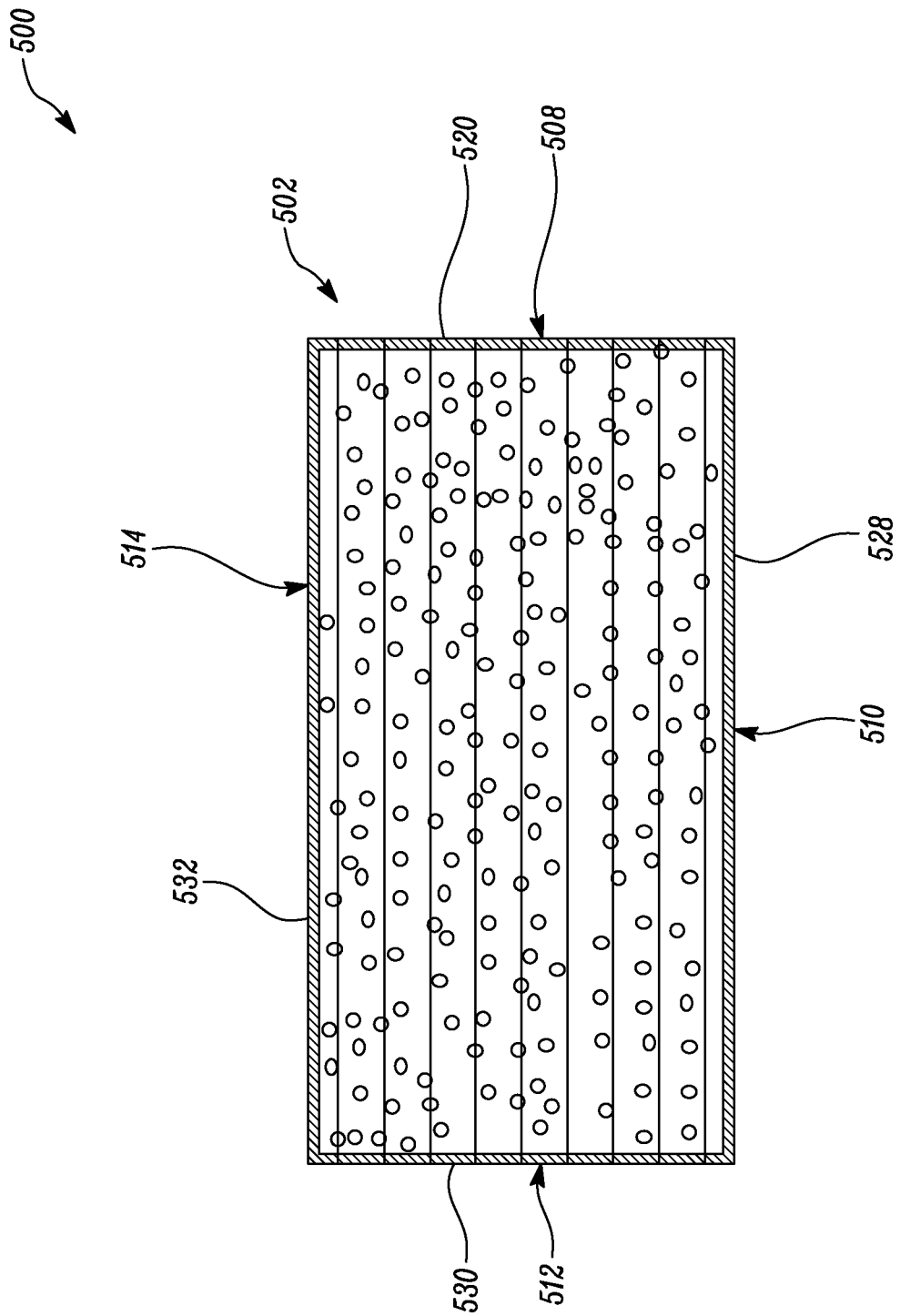
FIG. 5 is a top view of yet another optical film having a number of energy radiated discolored portions according to an embodiment of the present disclosure.

Referring now to FIG. 5, another optical film 500 is illustrated. The optical film 500 includes a film body 502 that is similar in construction, material, and design to the film body 202 described in relation to FIGS. 1 to 3. The film body 502 includes a plurality of outer edges 508, 510, 512, 514. Further, the at least one energy radiated discolored portion 520, 528, 530, 532 is formed in each of the plurality of outer edges 508, 510, 512, 514. In such an example, a radiation absorbing material is present in each of the outer edges 508, 510, 512, 514 of the film body 502. The radiation absorbing material is similar to the radiation absorbing material described earlier in this section with reference to the optical film 200. The radiation absorbing material may be mixed with resins of the film body 502 or the radiation absorbing material may be coated on each of the outer edges 508, 510, 512, 514. Further, each of the outer edges 508, 510, 512, 514 is irradiated by a laser beam (not shown) for forming the respective energy radiated discolored portions 520, 528, 530, 532 in the film body 502. The laser beam may include any of a carbon dioxide laser and an yttrium aluminum garnet laser.

Figure 6:
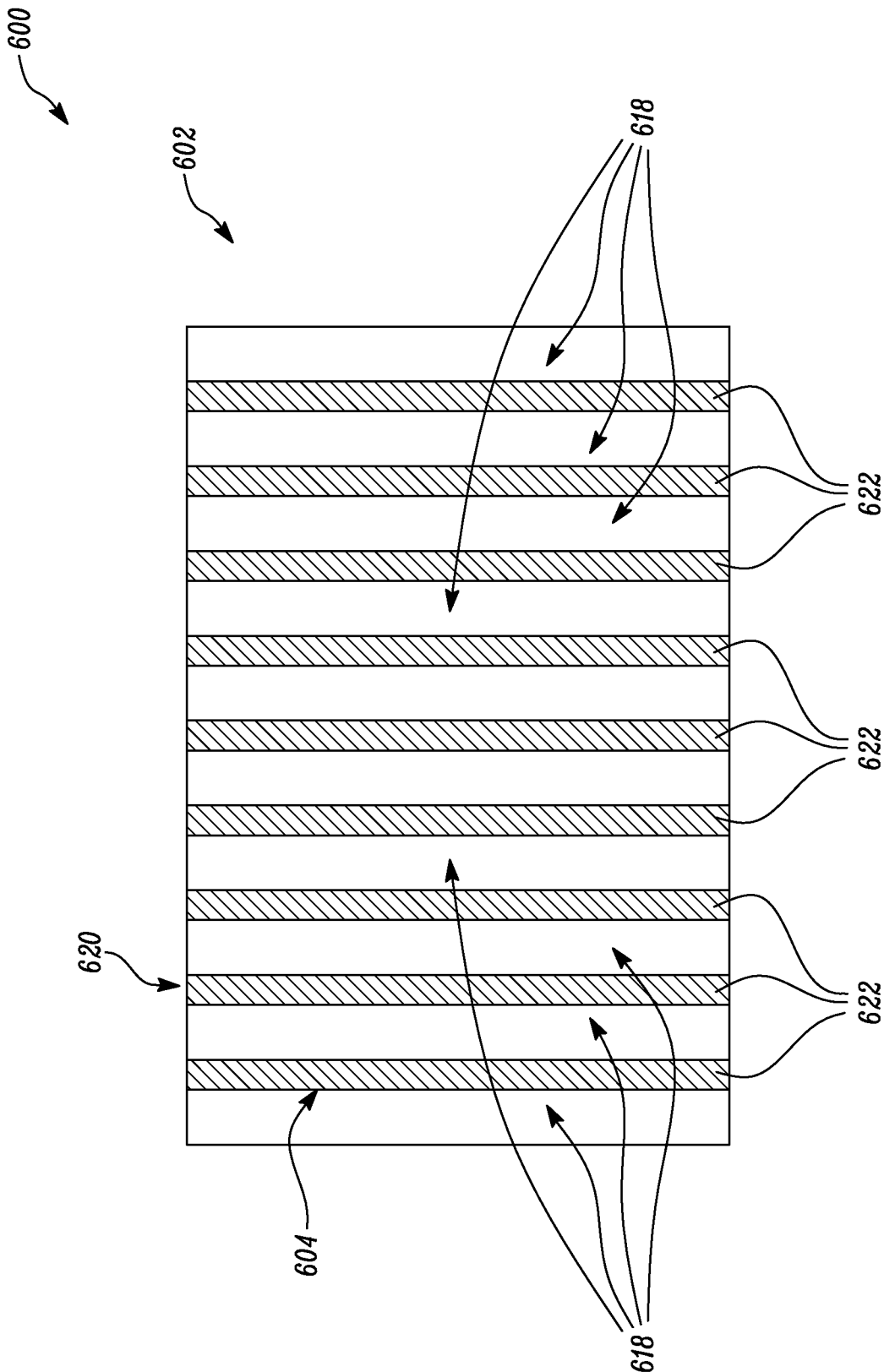
FIG. 6 is a top view illustrating an optical film having a plurality of linear energy radiated discolored portions formed in an upper surface of the optical film according to an embodiment of the present disclosure.

Referring now to FIG. 6, yet another optical film 600 is illustrated. The optical film 600 includes a film body 602. The optical film 600 is embodied as an LCF film. The film body 602 includes a plurality of transparent portions 618. The transparent portions 618 are parts of the optical film 600 that are not irradiated by a laser beam. Further, the optical film 600 include at least one energy radiated discolored portion 620. In this example, the at least one energy radiated discolored portion 620 includes a plurality of linear energy radiated discolored portions 622 formed in an upper surface 604 of the film body 602. More particularly, the film body 602 includes a number of linear radiated discolored portions 622 that are formed in the upper surface 604 of the film body 602.

In such an example, a radiation absorbing material is present in the upper surface 604 of the film body 602. The radiation absorbing material is similar to the radiation absorbing material described earlier in this section with reference to the optical film 200. The radiation absorbing material may be mixed with resins of the film body 602 or the radiation absorbing material may be coated on the upper surface 604 of the film body 602. Further, the upper surface 604 of the film body 602 is irradiated by a laser beam (not show) for forming the linear energy radiated discolored portions 620 in the upper surface 604 of the film body 602. The laser beam may include any of a carbon dioxide laser and an yttrium aluminum garnet laser.

Figure 7:
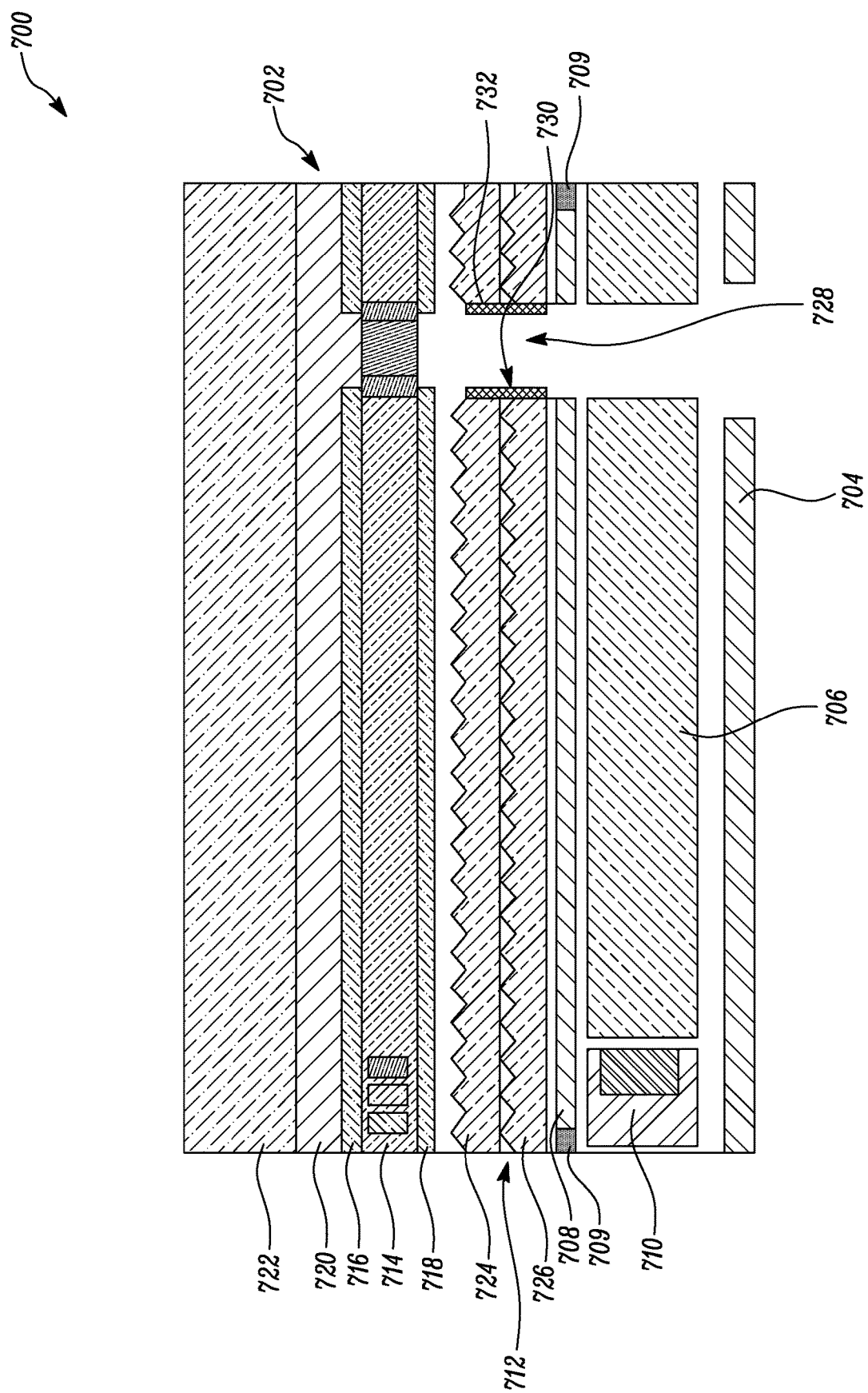
FIG. 7 illustrates a cross-sectional view of an optical film having an energy radiated discolored portion formed in an inner surface defining a through aperture according to an embodiment of the present disclosure.

Referring now to FIG. 7, an exemplary electronic device 700 is illustrated. The electronic device 700 includes a display 702. Further, the electronic device 700 includes a reflector 704, a chassis 710, a light guide plate 706, an optical film 712, and a diffuser film 708 disposed below the optical film 712. In the illustrated example, outer edges of the diffuser film 708 are irradiated using a laser beam (not shown) similar to the laser beam 226 shown in FIG. 2. More particularly, the outer edges are irradiated by the laser beam for forming an energy radiated discolored portion 709 at the outer edges of the diffuser film 708. In such an example, a radiation absorbing material may be present at the outer edges of the diffuser film 708. The radiation absorbing material is similar to the radiation absorbing material described earlier in this section with reference to the optical film 200. The radiation absorbing material may be mixed with resins of the diffuser film 708 or the radiation absorbing material may be coated on the outer edges of the diffuser film 708 up to a certain thickness. Further, the electronic device 700 also includes LCD cell 714 sandwiched between an upper polarizer 716 and a lower polarizer 718. Moreover, an Optically Clear Adhesive (OCA) 720 is disposed on a top portion of the upper polarizer 716. The OCA 720 allows adhesion of the upper polarizer 716 with a top panel 722 of the electronic device 700.

Further, the optical film 712 may be embodied as a stacked prism film having a first film body 724 and a second film body 726. The first film body 724 is disposed on the second film body 726. The first and second film bodies 724, 726 are similar in construction, material, and design to the film body 202 described in relation to FIGS. 1 to 3. The film bodies 724, 726 include at least one through aperture 728 defined by an inner surface 730. The through aperture 728 may be provided to receive a sensor module (not shown), such as a camera module. Further, an at least one energy radiated discolored portion 732 is formed in the inner surface 730 defining the at least one through aperture 728.

In such an example, a radiation absorbing material is present in the inner surface 730. The radiation absorbing material is similar to the radiation absorbing material described earlier in this section with reference to the optical film 200. The radiation absorbing material may be mixed with resins of the film bodies 724, 726 or the radiation absorbing material may be coated on the inner surface 730. Further, the inner surface 730 is irradiated by a laser beam (not shown) for forming the energy radiated discolored portion 732 in the inner surface 730. The laser beam may include any of a carbon dioxide laser and an yttrium aluminum garnet laser.

The optical films 200, 400, 500, 600, 712 described herein may be used in a number of electronic applications to realize a display having a narrow bezel width. Additionally, the above disclosure may provide a cost effective way to convert the optical film 200, 400, 500, 600, 712 into components while simultaneously forming the radiation energy discolored portions 220, 520, 528, 530, 532, 620, 732 in the corresponding optical films 200, 400, 500, 600, 712 using a laser beam.

Figure 8:
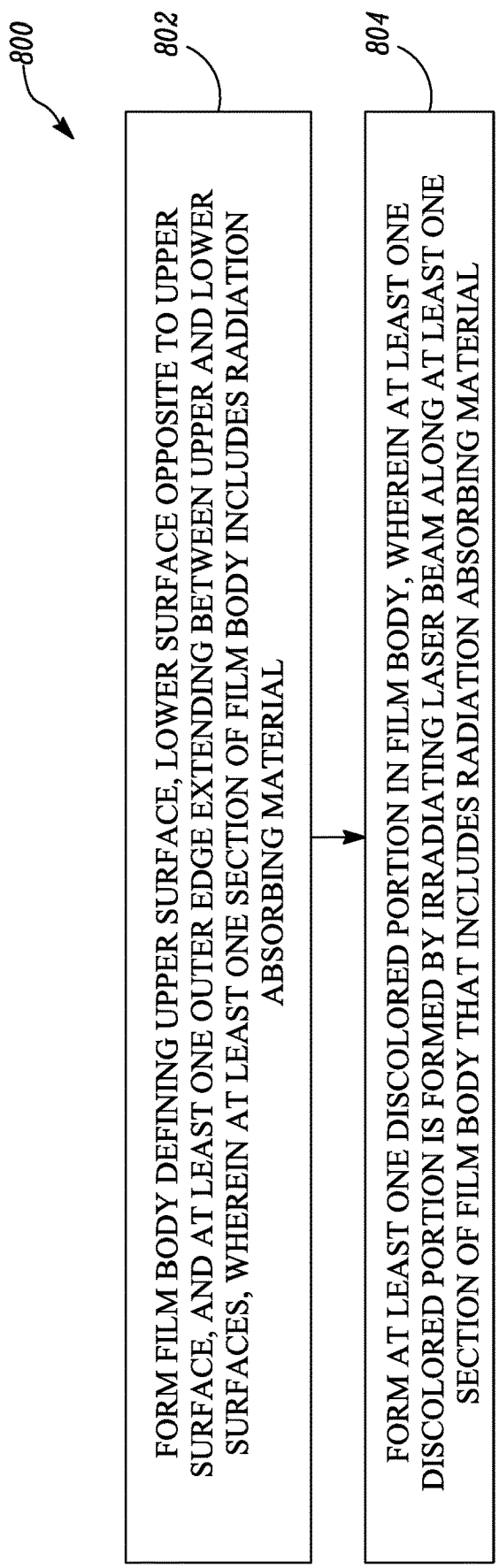
FIG. 8 is a flowchart for a method of manufacturing the optical film according to an embodiment of the present disclosure.

FIG. 8 is a flowchart for a method 800 of manufacturing the optical film 200, 400, 500, 600, 712. The method 800 will be described in relation to the optical film 200. However, the method 800 is equally applicable for manufacturing of the optical films 400, 500, 600, 712. At step 802, the film body 202 defining the upper surface 204, the lower surface 206 opposite to the upper surface 204, and the at least one outer edge 208 extending between the upper and lower surfaces 204, 206 is formed. The at least one section 222 of the film body 202 includes the radiation absorbing material. Further, the radiation absorbing material is an exothermic metal oxide.

At step 804, the at least one discolored portion 220 is formed in the film body 202. The at least one discolored portion 220 is formed by irradiating the laser beam 226 along the at least one section 222 of the film body 202 that includes the radiation absorbing material. In an example, the at least one discolored portion 220 is formed in the at least one section 222 of the at least one outer edge 208 of the film body 202. In another example, as shown in FIG. 5, the film body 502 includes the plurality of outer edges 508, 510, 512, 514. The at least one discolored portion 520, 528, 530, 532 is formed in each of the plurality of outer edges 508, 510, 512, 514. In yet another example, as shown in FIG. 6, the at least one discolored portion 520 is formed in the upper portion 518 of the film body 502. In one example, as shown in FIG. 7, the film body 724, 726 further includes at least one through aperture 728 defined by the inner surface 730. The at least one discolored portion 732 is formed in the inner surface 730 defining the at least one through aperture 728.

Figure 9:
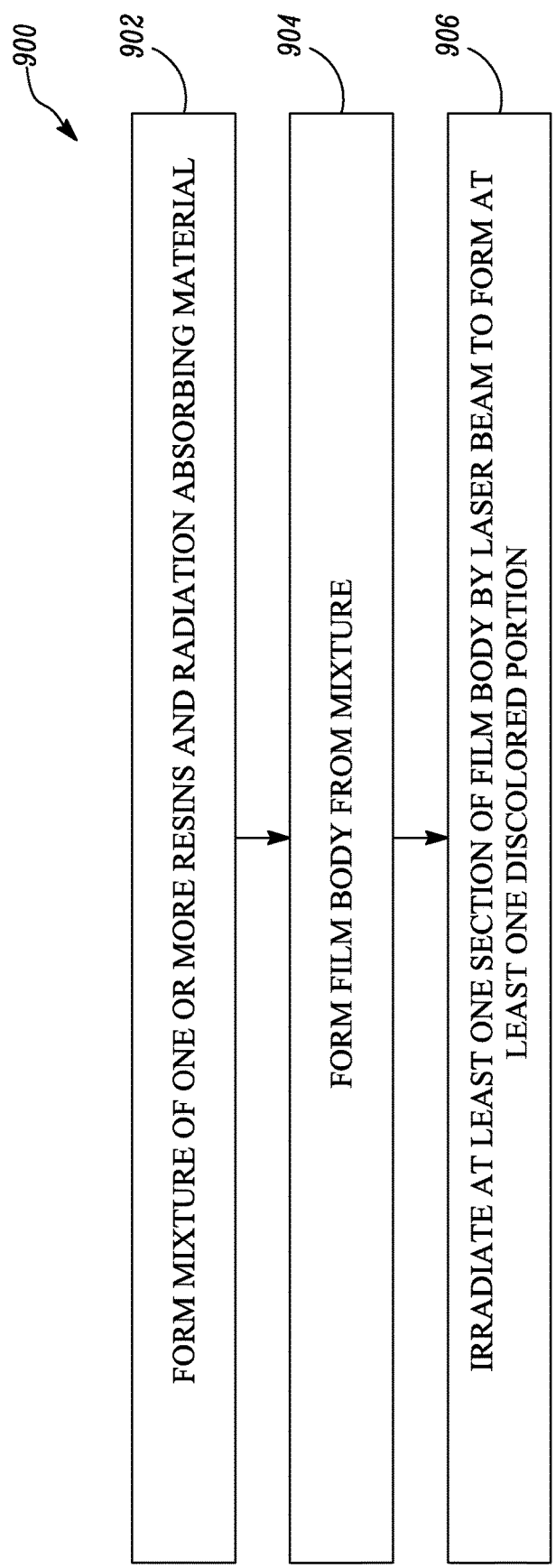
FIG. 9 is a flowchart for another method of manufacturing the optical film according to an embodiment of the present disclosure.

FIG. 9 is a flowchart for a method 900 of manufacturing the optical film 200, 400, 500, 600, 712. The method 900 will be described in relation to the optical film 200. However, the method 900 is equally applicable for manufacturing of the optical films 400, 500, 600, 712. At step 902, the mixture of one or more resins and the radiation absorbing material is formed. At step 904, the film body 202 is formed from the mixture. At step 906, the at least one section 222 of the film body 202 is irradiated by the laser beam 226 to form the at least one discolored portion 220. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

LIST OF ELEMENTS

Optical Films and Methods of Manufacturing Such Optical Films
FILE: 82139US002
- 100 Electronic Device
- 102 Display
- 104 LED
- 106 Light Guide Plate
- 108 Diffuser Film
- 110 Chassis
- 112 Rim Tape
- 114 Flexible Printed Circuit
- 200 Optical Film
- 202 Film Body
- 204 Upper Surface
- 206 Lower Surface
- 208 Outer Edge
- 210 Outer Edge
- 212 Outer Edge
- 214 Outer Edge
- 216 Substrate
- 218 Micro-Structures
- 220 Energy Radiated Discolored Portion
- 222 Section
- 226 Laser Beam
- 228 Laser Equipment
- 230 Particles
- 400 Optical Film
- 402 Film Body
- 408 Outer Edge
- 424 Coating
- 426 Laser Beam
- 428 Laser Equipment
- 500 Optical Film
- 502 Film Body
- 508 Outer Edge
- 510 Outer Edge
- 512 Outer Edge
- 514 Outer Edge
- 520 Energy Radiated Discolored Portion
- 528 Energy Radiated Discolored Portion
- 530 Energy Radiated Discolored Portion
- 532 Energy Radiated Discolored Portion
- 600 Optical Film
- 602 Film Body
- 604 Upper Surface
- 618 Transparent Portions
- 620 Energy Radiated Discolored Portion
- 622 Linear Energy Radiated Discolored Portions
- 700 Electronic Device
- 702 Display
- 704 Reflector
- 706 Light Guide Plate
- 708 Diffuser Film
- 709 Energy Radiated Discolored Portion
- 710 Chassis
- 712 Optical Film
- 714 LCD Cell
- 716 Upper Polarizer
- 718 Lower Polarizer
- 720 Optically Clear Adhesive
- 722 Top Panel
- 724 First Film Body
- 726 Second Film Body
- 728 Through Aperture
- 730 Inner Surface
- 732 Energy Radiated Discolored Portion
- 800 Method
- 802 Step
- 804 Step
- 900 Method
- 902 Step
- 904 Step
- 906 Step

The invention claimed is:

1. An optical film comprising:
   a film body defining an upper surface, a lower surface opposite to the upper surface, and at least one outer edge extending between the upper and lower surfaces; and
   at least one energy radiated discolored portion formed in the film body, wherein the at least one energy radiated discolored portion includes a radiation absorbing material, wherein the film body further comprises at least one through aperture defined by an inner surface, wherein the at least one energy radiated discolored portion is formed in the inner surface defining the at least one through aperture.

2. The optical film of claim 1, wherein the at least one energy radiated discolored portion is black in color.

3. The optical film of claim 1, wherein the at least one energy radiated discolored portion is configured to transmit less than 80% of incident light.

4. The optical film of claim 1, wherein the at least one energy radiated discolored portion is formed in at least a section of the at least one outer edge of the film body.

5. The optical film of claim 1, wherein the film body comprises a plurality of outer edges, and wherein the at least one energy radiated discolored portion is formed in each of the plurality of outer edges.

6. The optical film of claim 1, wherein the at least one energy radiated discolored portion is formed in the upper portion of the film body.

7. The optical film of claim 1, wherein the at least one energy radiated discolored portion comprises a plurality of linear energy radiated discolored portions formed in the upper surface of the film body.

8. The optical film of claim 1, wherein the radiation absorbing material is an exothermic metal oxide.

9. The optical film of claim 1, wherein the film body is made of one or more resins mixed with the radiation absorbing material.

10. The optical film of claim 1, wherein the film body includes a coating of the radiation absorbing material.

11. The optical film of claim 1, wherein a section of the film body is irradiated by a laser beam for forming the at least one energy radiated discolored portion in the film body.

12. The optical film of claim 11, wherein the laser beam includes at least one of a carbon dioxide laser and an yttrium aluminum garnet laser.

13. The optical film of claim 1, wherein the film body comprises a substrate and a plurality of micro-structures disposed on the substrate.

14. A method of manufacturing an optical film, the method comprising:
    forming a film body defining an upper surface, a lower surface opposite to the upper surface, and at least one outer edge extending between the upper and lower surfaces, wherein at least one section of the film body includes a radiation absorbing material, and wherein the film body comprises a plurality of outer edges, and wherein the at least one discolored portion is formed in each of the plurality of outer edges; and
    forming at least one discolored portion in the film body, wherein the at least one discolored portion is formed by irradiating a laser beam along the at least one section of the film body that includes the radiation absorbing material.

15. The method of claim 14, wherein the at least one discolored portion is formed in the at least one section of the at least one outer edge of the film body.

16. The method of claim 14, wherein the film body comprises a plurality of outer edges, and wherein the at least one discolored portion is formed in each of the plurality of outer edges.

17. The method of claim 14, wherein the at least one discolored portion is formed in the upper portion of the film body.

18. The method of claim 14, wherein the radiation absorbing material is an exothermic metal oxide.

19. A method of manufacturing an optical film, the method comprising:
    forming a mixture of one or more resins and a radiation absorbing material;
    forming a film body from the mixture; and
    irradiating at least one section of the film body by a laser beam to form at least one discolored portion and wherein the film body comprises a plurality of outer edges, and wherein the at least one discolored portion is formed in each of the plurality of outer edges.

* * * * *